US006990465B1

(12) United States Patent
Wandmacher et al.

(10) Patent No.: US 6,990,465 B1
(45) Date of Patent: Jan. 24, 2006

(54) ESTABLISHMENT OF PREFERRED BUSINESS PARTNERS USING A VENDOR CERTIFICATION PROGRAM

(75) Inventors: Randall R. Wandmacher, Chesterfield Township, MI (US); Daniel T. Smale, Grosse Pointe Farms, MI (US)

(73) Assignee: Accenture Global Services GmbH, Schaffhausen (CH)

( * ) Notice: Subject to any disclaimer, the term of this patent is extended or adjusted under 35 U.S.C. 154(b) by 91 days.

(21) Appl. No.: 10/056,569

(22) Filed: Jan. 25, 2002

(51) Int. Cl.
*G06F 17/60* (2006.01)

(52) U.S. Cl. ............................ 705/26; 705/1; 705/390; 707/503; 709/223; 717/151

(58) Field of Classification Search .................... 705/1, 705/7, 26, 390
See application file for complete search history.

(56) References Cited

U.S. PATENT DOCUMENTS 5,765,138 A * 6/1998 Aycock et al. ................. 705/7
6,397,197 B1 * 5/2002 Gindlesperger .............. 705/37

FOREIGN PATENT DOCUMENTS

JP 02002092147 A * 9/2000

OTHER PUBLICATIONS

Victorian Electronic Records Strategy, Vendor Compliance Program, VERS Compliance Certification Program, Public Record Office Victoria, PO Box 2100, North Melbourne VIC 3051.*

1996 ISO-Online Inc. , Home Page.*
Perry Johnson, Inc. www.pji.com.*
ISO 9000-2000, Translated into Plain English, Praxiom Research Group Limited.*
Online Learning at Florida State University 2001, www.fsu.edu.*
Computer Reseller News, p 30, Mar. 29, 1999, Journal ISSN: 0893-8377 (United States), Achieve vendor Certification online.*
Just in time: putting the squeeze on suppliers. Author: Moskal, Brian S.- Industry Week, vol.: 222, p.: 59(4), Jul. 9, 1984.*

* cited by examiner

*Primary Examiner*—James P. Trammell
*Assistant Examiner*—Daniel L. Greene
(74) *Attorney, Agent, or Firm*—Vedder, Price, Kaufman & Kammholz, P.C.

(57) ABSTRACT

A curriculum, based in subject matter expertise possessed by an entity, is provided to vendors in the form of a vendor certification program via a communication network. In exchange for a fee, vendors partake of the curriculum and, upon completion of at least a portion of the curriculum, are conferred certified vendor status by the entity. Certified vendor status confers preferential consideration by the entity when the entity undertakes acquisition decisions. Variable levels of certified vendor status may be achieved in direct proportion to the number of personnel affiliated with a vendor that successfully complete at least a portion of the vendor certification program, or in direct proportion to a percentage of the program completed. In this manner, entities can generate previously unrealized revenue and vendors are motivated to participate due to the preferential consideration given by the entity in exchange for successful completion.

34 Claims, 4 Drawing Sheets

ESTABLISHMENT OF PREFERRED BUSINESS PARTNERS USING A VENDOR CERTIFICATION PROGRAM

FIELD OF THE INVENTION

The present invention relates generally to education or learning system implemented via a communication network and, in particular, for a system for establishing preferred business partners using a vendor certification program offered via a communication network.

BACKGROUND OF THE INVENTION

It is generally understood that business entities exist primarily for the purpose of generating profits. Such entities, which may comprise any individual, organization or enterprise, typically offer one or more services or one or more products as a mean of generating revenue. In developing such services and/or products, entities will typically develop a high level of subject matter expertise in various areas concerning their services and/or products. A good example of this is an auto manufacturer that develops a wide array of subject matter expertise relating to the manufacture and sale of automobiles.

One aspect of profitability for such entities is their ability to obtain high quality goods and services from vendors at a reasonable price. In turn, the ability of a vendor to provide such high quality goods and services at a reasonable price often turns on the depth of knowledge the vendor has regarding the various aspects of the business of the entity to whom the vendor wishes to sell its goods and services. One solution that addresses the needs of both business entities and the vendors that supply them is to provide vendor certification programs in which vendors are provided the opportunity to develop greater understanding of the subject matter expertise possessed by the entity. In this manner, vendors are better able to meet the needs of the entity and do so in a more efficient manner, thereby allowing the vendor to charge for its goods and services at a more reasonable rate. In turn, the entity increases the likelihood that it will be able to acquire goods and services from vendors that are of a sufficiently high quality and reasonable cost to improve profitability performance.

One difficulty, however, with vendor certification programs is that they are often expensive for a given entity to implement, and typically do not provide sufficient revenue to the entity to justify the start-up costs. Furthermore, from the perspective of vendors attending such certification programs, there is no guarantee that attendance at such certification programs will confer any business advantage to the vendor relative to the entity providing the certification program. Thus, it would be advantageous to provide a technique whereby vendor certification programs may be more readily and efficiently provided by entities, and that provide a degree of incentive for vendors to participate.

SUMMARY OF THE INVENTION

The present invention provides a technique whereby entities are able to efficiently implement vendor certification programs that are used to develop preferred business partners. To this end, the present invention incorporates the use of electronic learning techniques whereby a curriculum, based in subject matter expertise possessed by an entity, is provided to vendors in the form of a vendor certification program via a communication network. In exchange for a fee, vendors are allowed to partake of the curriculum offered in the vendor certification program and, upon completion of at least a portion of the curriculum, are conferred certified vendor status by the entity. Such certified vendor status likewise confers preferential consideration by the entity when the entity undertakes acquisition decisions. In one embodiment of the present invention, the vendor certification program may be provided through a public communication network such as the Internet or World Wide Web or, in another embodiment of the present invention, may be provided through a private communication network. In yet other embodiments of the present invention, variable levels of certified vendor status may be achieved in direct proportion to the number of personnel affiliated with a vendor that successfully completes at least a portion of the vendor certification program, or in direct proportion to a percentage of the program completed. Using these techniques, the present invention allows entities to generate revenue through the provision of the vendor certification program. Additionally, vendors are incentivized to participate in the vendor certification program and to pay a fee for such participation due to the preferential consideration such vendors will receive in acquisition decisions by the entity in exchange for successful completion of the vendor certification program.

DETAILED DESCRIPTION OF THE PREFERRED EMBODIMENT

Figure 1:
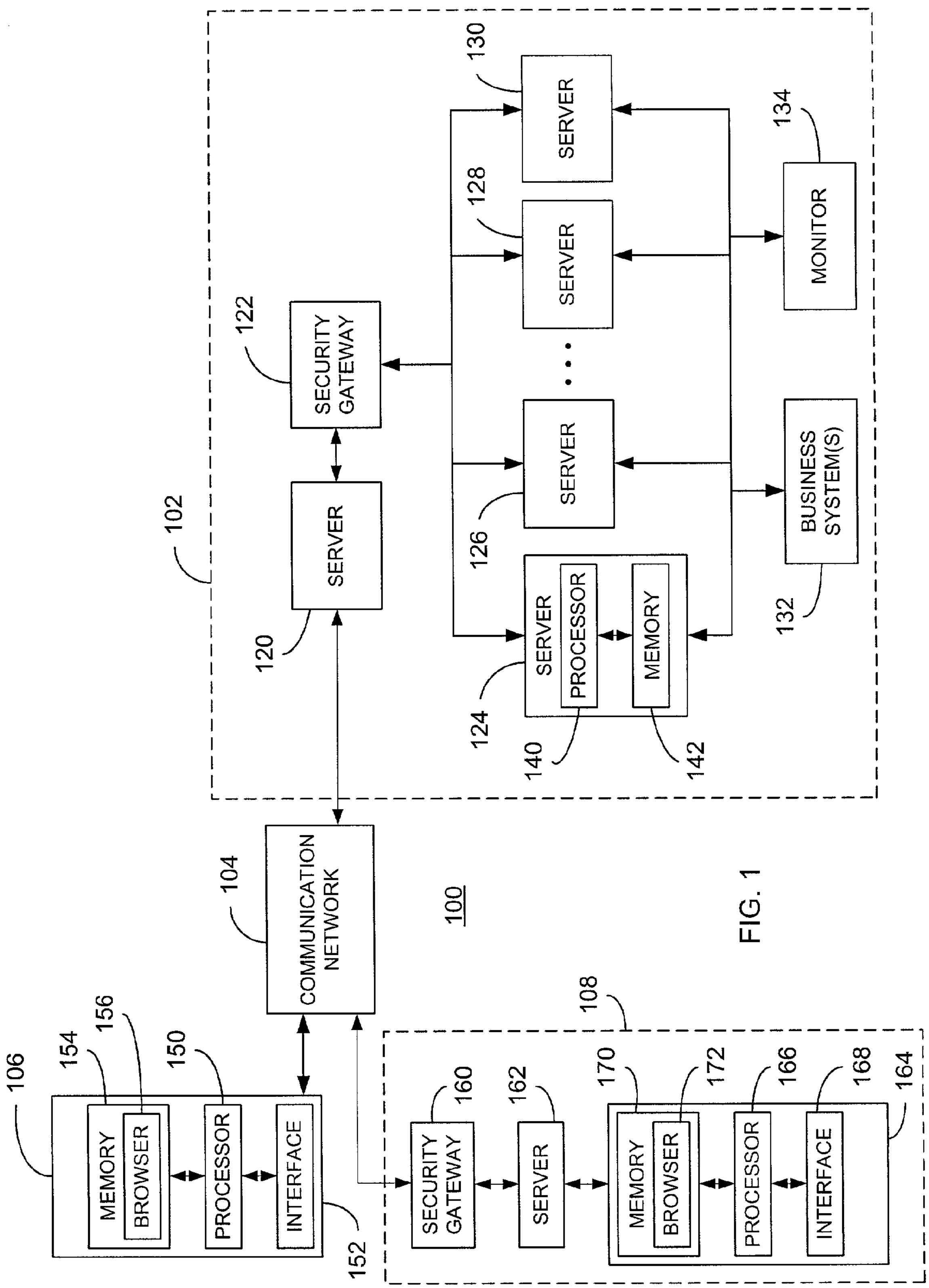
FIG. 1 is a block diagram of a system in accordance with the present invention.

The present invention may be more fully described with reference to FIGS. 1–5. Referring now to FIG. 1, a system 100 is illustrated comprising a certification program framework 102, a communication network 104, remote clients 106 (only one shown) and enterprises 108 (only one shown). As shown, the certification program framework 102 comprises a variety of components used to implement a vendor certification program by or on behalf of an entity. In particular, a server 120, which may comprise a web server such as a Compaq Proliant DL380 running MS NT and MS IIS as known in the art, is provided as a host for front-end applications used to implement a vendor certification program in accordance with the present invention. The server 120 is coupled to the communication network 104 which is described in greater detail below. Additionally, the server 120 is coupled to a security gateway 122 which functions to provide secure access to various databases and secure applications used to implement a vendor certification program in accordance with the present invention. A suitable platform for implementing the security gateway is an SL **100*r* with Ultra Sparc II processor workstation running Check Point VPN-1 Gateway Encryption Module software. The security gateway 122 is coupled to a plurality of servers 124–130** used to host the databases and secure applications. Although shown in only a single server 124, each of the servers 124–130 comprises a processor 140 coupled to a memory 142. As known in the art, the processor 140 may comprise a microprocessor, microcontroller, digital signal processor or the like, or combinations thereof. Likewise, the memory 142 may comprise various combinations of volatile and non-volatile digital storage devices such as random access memory (RAM), read only memory (ROM), hard drives, optical drives, etc. The memory 142 may be used to store software programs executed by the processor 140. Additionally, the memory 142 may store data that is manipulated by the software programs stored in the memory 142 and executed by the processor 140. Furthermore, although a parallel implementation of a plurality of servers 124–130 is illustrated in FIG. 1, those having ordinary skill in the art will recognize that a variety of server architectures may be used in accordance with the present invention, and that the number of such servers used is a matter of design choice.

As also shown in FIG. 1, one or more business systems 132 may be coupled to the plurality of servers 124–130. In particular, the business systems 132 comprise those functions used by the entity implementing the vendor certification program to execute acquisition decisions on behalf of the entity. In the context of the present invention, an acquisition decision encompasses the business intelligence, and tools in support thereof, used by the entity when deciding what types of goods and services to acquire for the entity's ongoing operations as well as the particular sources from which to obtain such goods and services. As such, the business systems 132 may comprise a wide array of resources from an individual's knowledge and expertise to automated ordering systems to procurement policies and procedures. As described in greater detail below, information regarding certified vendor status that has been granted to one or more vendors is preferably stored within the databases forming a part of the certification program framework 102. Additionally, as known in the art, a monitor 134 is preferably provided to monitor various aspects of system performance, such as verifying system up-time, processing speeds, security breaches, bandwidth used, etc.

The communication network 104 couples the certification program framework 102, via the server 120, to one or more remote clients 106 (only one shown) as well as one or more enterprises 108 (only one shown). In a preferred embodiment, the communication network 104 comprises a public network such as the Internet or World Wide Web. Alternatively, the communication network 104 may comprise, in part or in whole, a private communication network such as an Intranet or Extranet, possibly operating in conjunction with the aforementioned public network. Furthermore, the communication network 104 may comprise elements capable of supporting wireless connections from the remote client 106 or enterprise 108 with the communication network itself.

The remote client 106 comprise devices capable of communicating, via the communication network 104, with the certification program framework 102. Preferably, the remote client 106 comprises a computer platform such as a laptop or desktop computer. As known in the art, such devices comprise a processor 150 in communication with memory 154 and a network interface 152. As in the case of the plurality of servers 124–130, the processor 150 included in the client 106 may comprise a microprocessor, microcontroller, digital signal processor or the like, or combinations thereof. Likewise, the memory 154 may comprise long-term and short-term storage elements embodied as RAM, ROM, and the like, or combinations thereof. In a preferred embodiment, a network browser application 156, such as Netscape Navigator by Netscape Communications Corporation or Internet Explorer by Microsoft Corporation, is stored in the memory 154 for execution by the processor 150. The browser application 156 allows a user of the remote client 106 to access a vendor certification program offered by an entity. Those having ordinary skill in the art will recognize that other applications may be used for this purpose as a matter of design choice. Although not shown in FIG. 1, the remote client 106 also comprises a display, such as a liquid crystal display (LCD) or similar device, that may be used to display data received by the browser application 156 in conjunction with the vendor certification program. Additionally, a user input mechanism (not shown), such as a keyboard, mouse, voice recognition or similar means or combinations thereof, is preferably provided thereby allowing a user of the remote client 106 to interact with the vendor certification program, preferably via the browser application 156. The network interface 152 is capable of communicating with the communications network 104 and supports a communications protocol needed to communicate with the certification program framework 102.

The enterprise 108 may comprise any organization, such as a company, that provides network connectivity via a security gateway 160 and/or a server 162. Arrangements and implementations of the security gateway 160 and server 162 in the context of an enterprise environment are well known in the art and need not be described in great detail here. The security gateway 160 and server 162 provide access for another remote client 164 to the communication network 104. As in the case of the first remote client 106 described above, the remote client 164 residing within the enterprise 108 comprises a processor 166 coupled to an interface 168 and memory 170. Likewise, the memory 170 comprises a browser application 172 capable of communicating with the vendor certification program. In this instance, the interface 168 allows the remote client 164 to communicate with the server 162 using a suitable protocol. Further still, the remote client 164 also includes the input mechanism and display previously described. Information exchanged with the server 162 by the remote client 164 is thereafter exchanged with the communication network 104 via the security gateway 160 as known in the art. In short, the remote clients 106, 164 illustrate the two most typical ways through which a vendor may access the vendor certification program in accordance with the present invention. Nevertheless, the present invention is not limited in the manner in which vendors access the vendor certification program.

Figure 2:
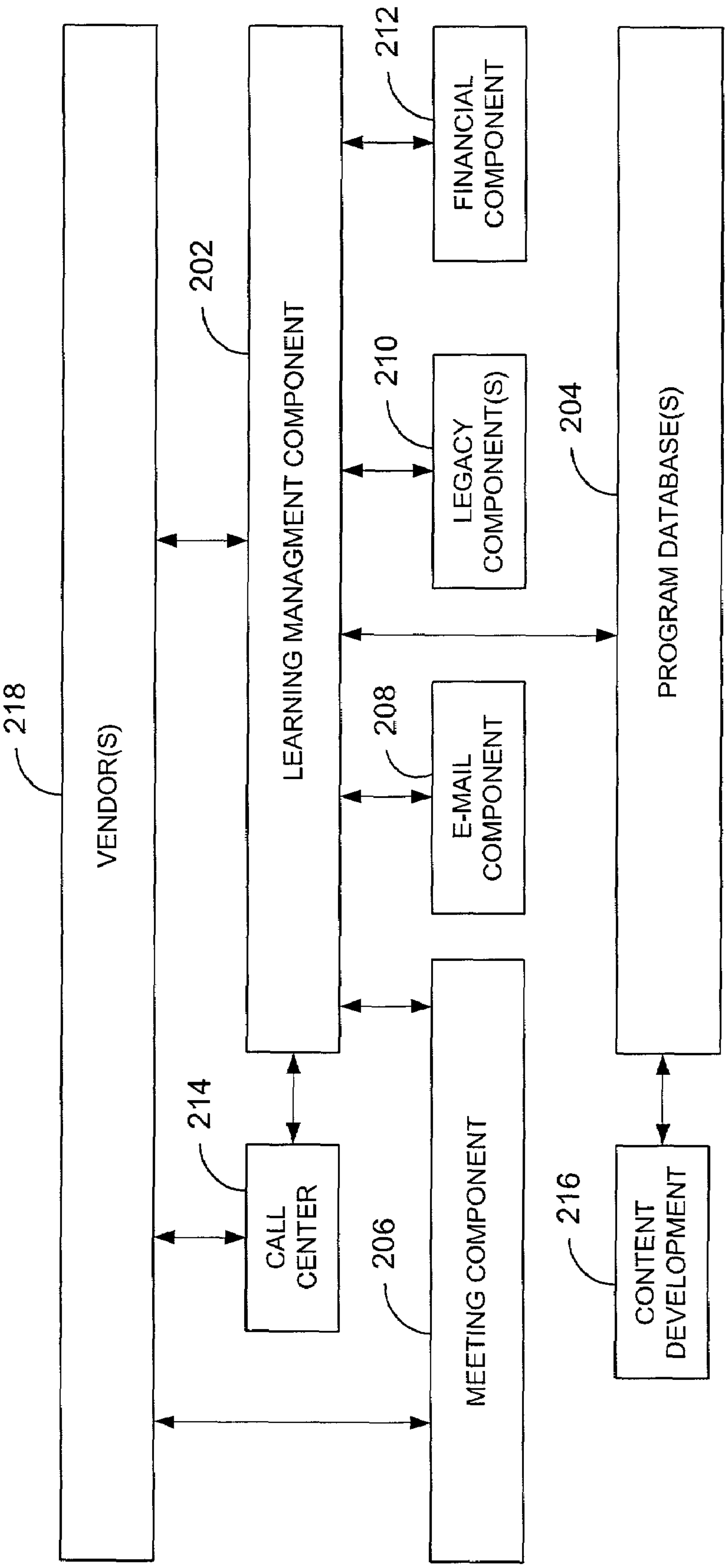
FIG. 2 is a block diagram schematically illustrating an implementation of a vendor certification program in accordance with the present invention.

Referring now to FIG. 2, a diagram illustrating the functional components of a vendor certification program in accordance with a preferred embodiment of the present invention is illustrated. In particular, a learning management component 202 is provided. A suitable example of a learning management component 202 is the Learning Management System provided by Docent Incorporated. The learning management component 202 handles a variety of functions related to the delivery of a structured curriculum such as registration of students, scheduling, testing of students, as well as the actual delivery of course content. The learning management component 202, in turn, is coupled to one or more program databases 204. The program database 204 is preferably implemented using one or more servers implementing suitable database software, such as Oracle database software. The program database 204 stores the actual course content delivered to students via the learning management component 202. Additionally, the program database 204 may store information regarding certified vendor status for those vendors that have successfully completed at least a portion of the curriculum of the vendor certification program. The program database 204 is also coupled to a content development block 216. The content development component 216 provides updates and revisions to the curriculum comprising the vendor certification program. Suitable web-content training development tools, including Docent's Content Delivery Server application, or others, like MS Front Page, may be used for this purpose.

The learning management component 202 is coupled to a variety of supporting components 206–212. A meeting component 206 provides a means whereby students can, via the learning management component 202, schedule virtual face-to-face meetings with instructors. Suitable software for providing such virtual meetings may be provided using Centra Software's eMeeting software. An e-mail component 208 is provided in order to send informational and confirmation messages to registered students. The legacy components 210 include various management-related software such at that provided by SAP, Peoplesoft, JD Edwards, etc. A connection is provided between the system and such legacy components 210 as a means to track what has transpired in the system. A financial component 212 interfaces to the necessary electronic commerce software used to handle financial transactions resulting from the provision of the vendor certification program. To this end, students may pay for courses offered in the vendor certification program using a credit card as known in the art. Software suitable for handling such credit card transactions is provided by Verisign Incorporated. Additionally, the financial component 212 may interface with software, such as that provided by Taxware International Incorporated, capable of computing the necessary tax calculations on any financial transactions. A call center 214 is provided as a means for students to contact a representative when necessary. In turn, the call center 214 is coupled to the learning management component 202 to ensure continuous reliable operation of the vendor certification program. Finally, vendors 218 are illustrated as being in communication with the learning management component 202, the call center 214, and the meeting component 206. Communication by the vendors 218 with each of these components is preferably enabled via a communication network as described above with reference to FIG. 1.

Figure 3:
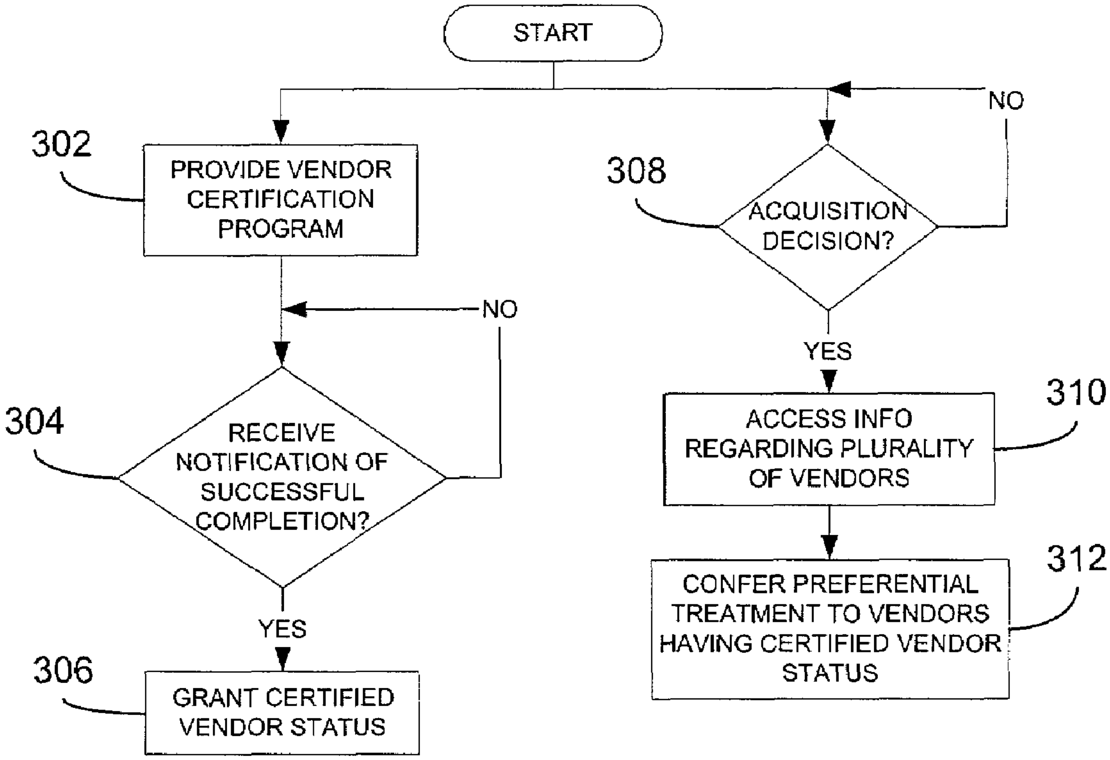
FIG. 3 is a flow chart illustrating a method for an entity to provide a vendor certification program and to make acquisition decisions based on certified vendor status.

Referring now to FIG. 3, there is illustrated a flow chart describing the implementation and use of a vendor certification program in accordance with the present invention. Unless otherwise noted, the operations illustrated in FIG. 3 are preferably implemented using a suitable computer-based platform, such as the certification program framework 102. Beginning at block 302, an entity provides a vendor certification program. To this end, the entity can implement the certification program framework 102 as illustrated in FIG. 1, or it can engage the services of a third party that has implemented a suitable framework. In order to implement such a program, the entity must first define a suitable curriculum relating to one or more areas in which it has subject matter expertise. As known in the art, such a curriculum will comprise one or more courses comprising material that is to be mastered by the students and one or more tests used to gauge the proficiency of such students as they take the course. Once a suitable curriculum has been developed, it is made available via a communication network, preferably using the certification program framework 102. In a presently preferred embodiment, the curriculum is accessible via a web page implementation using well known programming techniques.

Once the vendor certification program has been made available, one or more vendors may register for the program. In the context of the present invention, vendors are understood to comprise individuals that are employed by or are otherwise affiliated with organizations that act as suppliers to the entity offering the certification program. Thus, it is possible for more than one individual from any given organization to be participating in the vendor certification program. Such individuals are treated as representatives of the vendor organizations to which they belong. Assuming one or more such individuals have registered for the vendor certification program, processing continues at block 304 where it is determined whether notification of successful completion of at least a portion of the curriculum has been received. As described below, such notification may be provided at any one of a number of numerous points throughout a students progression through the curriculum. Upon receiving notification of successful completion of at least a portion of the curriculum, the entity grants certified vendor status to the vendor indicated in the notification. In one embodiment of the invention, certified vendor status may be divided into a plurality of levels corresponding to successive levels of achievement within the vendor certification program. For example, relative to a given vendor, progressively preferred levels of certified vendor status may be granted in direct proportion to the number of personnel associated with that vendor having successfully completed at least a portion of the vendor certification program. Alternatively, successive levels of status may correlate to increasing percentages of successfully completed portions of the vendor certification program. Regardless, once granted, certified vendor status confers upon the recipient preferential consideration by the entity when undertaking acquisition decisions. This is further illustrated with regard to blocks 308–312.

At block 308, it is determined by the entity whether an acquisition decision needs to be undertaken. The determination whether such decisions need to be made is typically highly dependent upon the nature of the entity's business. If so, processing continues at block 310 where the entity accesses information regarding a plurality of vendors. In particular, the entity accesses the program database 204 of the vendor certification program to determine if any vendors in the relevant area have attained certified vendor status. Thereafter, at block 312 the entity will confer preferential treatment to those vendors that have achieved certified vendor status.

For example, assume that an automotive manufacturing company desires to obtain certain parts for engine assemblies. Further assume that there are a plurality of appropriate vendors capable of providing the desired components. When determining which vendor to hire for this purpose, the auto manufacturer will determine if any of the potential vendors have received certified vendor status by virtue of completion of at least a portion of the vendor certification program relating to the design and operation of that manufacturer's engine assemblies. Such vendors thereafter will be given preferential treatment by the auto manufacturer when deciding which vendor to award the contract to. Such preferential treatment may be manifested in any of a number of ways. For example, the preferred vendors may be approached before any other vendors with the opportunity. Conversely, the opportunity could be presented to a plurality of vendors at the same time, however, limited only to those vendors having the certified status. Those having ordinary skill in the art will recognize that the manner in which preferential treatment is manifested will be highly dependent upon the nature of the business engaged in by the entity conferring such status. In this manner, the auto manufacturer, having charged fees for its certification program, will have generating previously unavailable revenue while at the same time cultivating more reliable sources for its acquisition needs. Conversely, vendors will have gained valuable knowledge with regard to their likely clients and in so doing will have obtained a preferred status with those clients.

Figure 4:
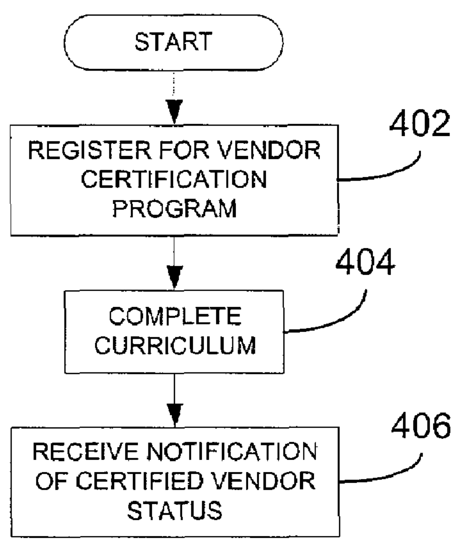
FIG. 4 is a block diagram of a method whereby a vendor may obtain certified vendor status.

Referring now to FIG. 4, a technique for a vendor to participate in a vendor certification program in accordance with the present invention is shown. Where applicable, the technique illustrated in FIG. 4 and described herein is preferably implemented using a computer-based platform, such as the remote clients 106, 164 shown in FIG. 1. At block 402, a vendor registers for the vendor certification program provided by a given entity. In a preferred embodiment, a vendor certification program is provided via a communication network thereby enabling the vendor to participate in the program remotely. In this regard, the vendor, as that term is used herein, comprises one or more personnel employed by or otherwise affiliated with the vendor. At block 404, having registered for the vendor certification program, the vendor completes at least a portion of the curriculum in a successful manner. Thereafter, at block 406 the vendor is notified that certified vendor status has been conferred upon the vendor by the entity administering the vendor certification program. Such notification may be sent to the vendor in an electronic form, such as through the communication network, or in a more conventional form, such as a certificate or the like. Furthermore, when varying levels of certified vendor status exist, the vendor may be notified of attainment of a certain level of vendor status. A more detailed description of the manner in which a vendor partakes in the vendor certification program is further provided with reference to FIG. 5 below.

Figure 5:
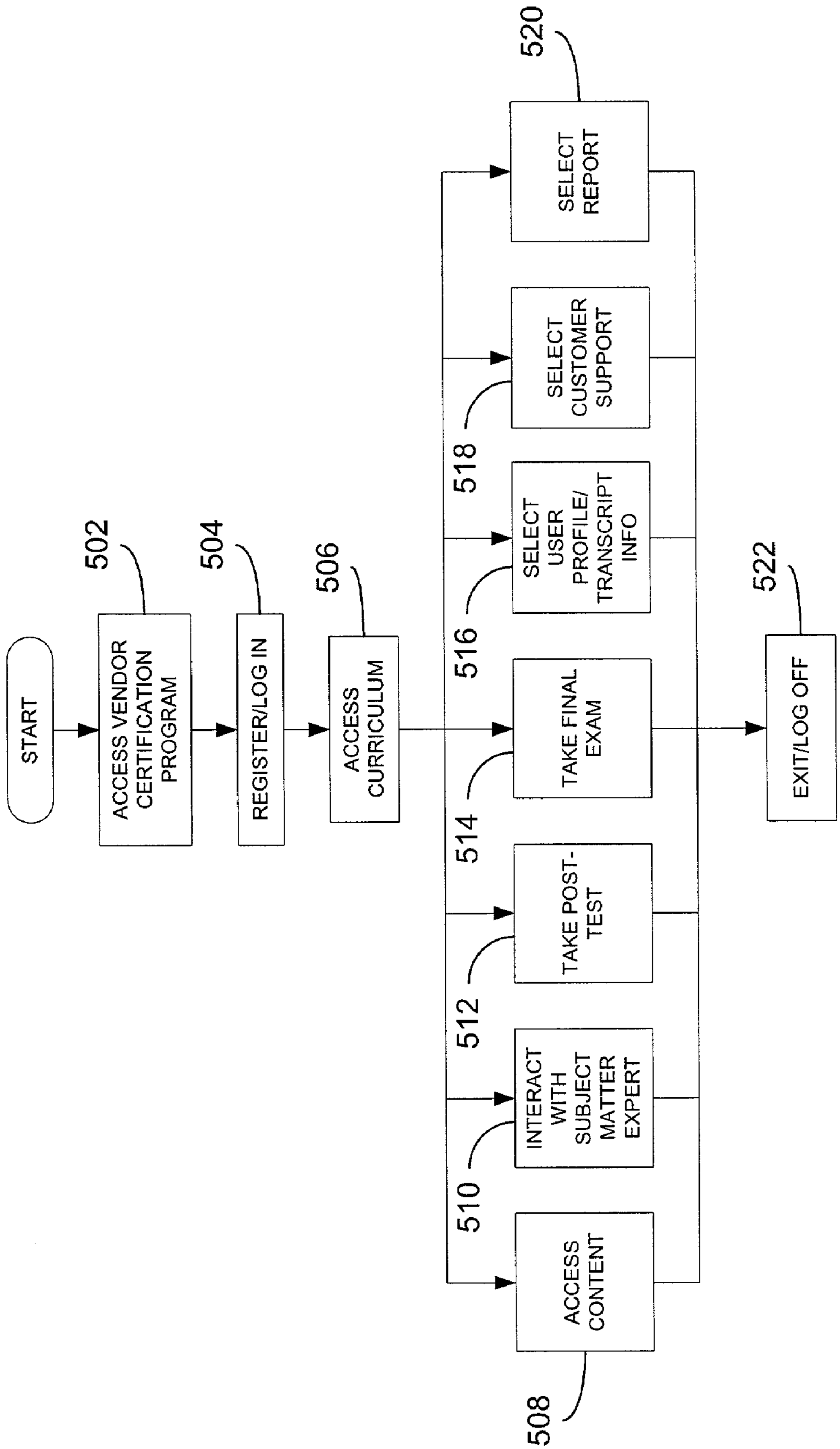
FIG. 5 is a flow chart illustrating operation of a vendor certification program in accordance with one embodiment of the present invention.

Referring now to FIG. 5, progression through a vendor certification program by a student in accordance with a presently preferred embodiment is illustrated in greater detail. At block 502, a vendor accesses the vendor certification program. As described above, this is preferably achieved through the use of a browser communication program running on an appropriate computer platform. At block 504, the vendor may register for the vendor certification program if they have not done so previously. To this end, the vendor is requested to complete a registration form which requests the vendor to identify itself or, more particularly, for the individual to identify the vendor that he/she works for or is otherwise affiliated with. Optionally, upon completion of the registration form by the vendor, the entity may determine whether the vendor is approved for this particular vendor certification program. If the vendor is approved, then it will be able to proceed with the vendor certification program. If the vendor has previously registered with the program, it is requested to log-in at block 504. Thereafter, at block 506, the vendor is able to access the curriculum for the vendor certification program. In a presently preferred embodiment, this will comprise a course catalog including descriptions of, and prerequisite requirements for, each course available.

From block 506, the vendor may pursue any of the number of options illustrated by blocks 508–520. At block 508, the vendor accesses content portions of the curriculum. If this is not new content to the vendor, then the vendor is allowed to proceed directly to the relevant material. Conversely, if this is new content to the vendor, the vendor is informed of any prerequisites necessary to access the content. If such prerequisites do not exist, or if they have been met by this vendor, the vendor is able to pay the necessary fee to access the content. In a preferred embodiment, once content has been paid for by a vendor the vendor is allowed unlimited access thereafter to that content. At any time after having accessed the content, the vendor may exit the content and reenter subsequently.

If the vendor has completed the content it is required, in a presently preferred embodiment, to first interact with a subject matter expert at block 510. To this end, the vendor schedules such a meeting with the relevant expert. Thereafter, at the appointed time, the vendor may access the vendor certification program in the same manner and conduct a "virtual" meeting with the subject matter expert. During such a meeting, the vendor is able to ask any questions or clarify any points regarding the content previously studied by the vendor. If included as part of the curriculum, the vendor is thereafter eligible to take a post test at block 512. Such a post test is essentially equivalent to a quiz used in more traditional learning environments. Techniques for administering quizzes or tests via a communication network are well known in the art and need not be described in further detail herein. Optionally, when provided, the vendor may take a final exam at block 514. The final exam is the final arbiter on behalf of the entity whether the vendor has sufficiently mastered the subject matter provided by the content at block 508. Successful completion of the final exam may thereafter trigger conferral and notification of certified vendor status as described previously. Alternatively, such conferral and notification may occur at other points in time and to varying degrees. For example, upon completion of the post test at block 512, the vendor could be notified of a lesser degree of certified vendor status, which would be elevated to a greater degree upon successful completion of the final exam. Alternatively, certified status could be granted only after a number of courses have been successfully completed all the way through final exams. Regardless, the present invention is not limited in this regard.

A variety of administrative functions are also provided as illustrated by blocks 516–520. At block 516, the vendor may elect to view and/or edit a user profile or to view transcript information. If desired, the vendor may select a report option at block 520 that allows the vendor to obtain reports regarding account transaction, assessment reports, class schedule reports or related information. Further still, at block 518, the vendor may select a customer support option. In this manner, the vendor may be coupled to customer support personnel or be provided with information allowing the vendor to contact customer support personnel off-line.

The foregoing description of a preferred embodiment of the invention has been presented for purposes of illustration and description, it is not intended to be exhaustive or to limit invention to the precise form disclosed. The description was selected to best explain the principles of the invention and practical application of these principles to enable others skilled in the art to best utilize the invention and various embodiments, and various modifications as are suited to the particular use contemplated. For example, the present invention is not necessarily limited in its application to vendors alone. Other affiliates of an entity that may benefit from the provision of an on-line curriculum and certification program are within the scope of the present invention. For example, referring again to the automobile manufacturer examples stated above, in addition to vendors, automobile dealerships (as an affiliate of the automobile manufacturer) may also participate in certification programs offer by the manufacturer. Upon successful completion of the program, the dealership is conferred preferred status with respect to its relationship with the manufacturer. In any event, it is intended that the scope of the invention not be limited by the specification, but be defined by the claims set forth below.

What is claimed is:

1. A method to establish preferred business partners via a communication network, the method comprising:

electronically providing a vendor certification program comprising a curriculum via the communication network on a fee basis;

electronically receiving a notification, from an entity administering the vendor certification program, that a vendor has successfully completed the vendor certification program; and granting certified vendor status by the entity upon the vendor indicated in the notification, wherein the certified vendor status confers preferential consideration to the vendor during acquisition decisions by the entity.

2. A computer-readable medium having stored thereon computer-executable instructions for implementing the method of claim 1.

3. The method of claim 1, wherein the curriculum is based on subject matter expertise possessed by the entity.

4. The method of claim 1, further comprising: undertaking an acquisition decision;

accessing information regarding a plurality of vendors, the plurality of vendors comprising at least one vendor having certified vendor status; and providing preferential consideration to the at least one vendor having certified vendor status when resolving the acquisition decision.

5. The method of claim 1, wherein the vendor comprises a plurality of personnel, and wherein granting of the certified vendor status further comprises granting variable levels of certified vendor status such that increasing numbers of the plurality of personnel that have successfully completed the vendor certification program confers increasing levels of preferential consideration.

6. The method of claim 1, further comprising providing the vendor certification program, at least in part, via a public communication network.

7. The method of claim 6, further comprising providing the vendor certification program, at least in part, via either of an Internet or World Wide Web communication network.

8. The method of claim 1, further comprising providing the vendor certification program, at least in part, via a private communication network.

9. A method, via a communication network, for a vendor to obtain preferred status from an entity, the method comprising:

electronically registering for a fee-based vendor certification program provided by the entity, wherein the vendor certification program comprises a curriculum;

successfully completing the curriculum via the communication network; and receiving, from the entity, a notification of certified vendor status in response to successful completion of the curriculum, wherein the certified vendor status confers preferential consideration during acquisition decisions by the entity.

10. A computer-readable medium having stored thereon computer-executable instructions for implementing the method of claim 9.

11. The method of claim 9, wherein the curriculum is based on subject matter expertise possessed by the entity.

12. The method of claim 9, wherein the vendor comprises a plurality of personnel, and wherein receiving the certified vendor status further comprises receiving variable levels of certified vendor status such that increasing numbers of the plurality of personnel that have successfully completed the vendor certification program results in increasing levels of preferential consideration.

13. The method of claim 9, further comprising successfully completing the vendor certification program, at least in part, via a public communication network.

14. The method of claim 13, further comprising successfully completing the vendor certification program, at least in part, via either of an Internet or World Wide Web communication network.

15. The method of claim 9, further comprising successfully completing the vendor certification program, at least in part, via a private communication network.

16. An apparatus to establish preferred business partners via a communication network, the apparatus comprising:

a network interface for communicating with the communication network; at least one processor coupled to the network interface; and at least one memory device, coupled to the at least one processor, having stored thereon executable instructions that, when executed by the at least one processor, cause the at least one processor to:

provide a vendor certification program comprising a curriculum via the network interface on a fee basis;

provide a notification that a vendor has successfully completed the vendor certification program; and store information regarding certified vendor status based on the successful completion of the vendor certification program, wherein the certified vendor status confers preferential consideration to the vendor during acquisition decisions by an entity.

17. The apparatus of claim 16, wherein the curriculum is based on subject matter expertise possessed by the entity.

18. The apparatus of claim 16, wherein the curriculum is stored in the at least one memory device.

19. The apparatus of claim 16, wherein the network interface communicates with a public communication network.

20. The apparatus of claim 19, wherein the network interface communicates with either of an Internet or World Wide Web communication network.

21. The apparatus of claim 16, wherein the network interface communicates with a private communication network.

22. A system whereby an entity establishes relationships with vendors via a communication network, the system comprising:

an electronic learning management component, operatively coupled to the communication network, that administers a vendor certification program on behalf of an entity; and at least one database, coupled to the learning management component, comprising a curriculum offered as part of the vendor certification program, and comprising information indicating that a vendor has certified vendor status after successfully completing the curriculum thereby entitling the vendor to preferential consideration during acquisition decisions by the entity.

23. The system of claim 22, wherein the curriculum is based on subject matter expertise possessed by the entity.

24. The system of claim 22, further comprising:

a delivery component, coupled to learning management component, for delivering the curriculum to the vendor.

25. The system of claim 22, further comprising:

a financial transaction component, coupled to the learning management component, that handles payment by the vendors for participation in the vendor certification program.

26. The system of claim 22, wherein the network interface communicates with a public network.

27. The system of claim 26, wherein the network interface communicates with either of Internet or World Wide Web networks.

28. The system of claim 22, wherein the network interface communicates with a private network.

29. An apparatus for a vendor to obtain preferred status from an entity via a communication network, the apparatus comprising:

a network interface for communicating with the communication network; at least one processor coupled to the network interface; and at least one memory device, coupled to the at least one processor, having stored thereon executable instructions that, when executed by the at least one processor, cause the at least one processor to:

electronically receive a curriculum included in a vendor certification program offered by the entity via the communication network;

receive, from the entity, a notification of certified vendor status in response to successful completion of the curriculum, wherein the certified vendor status confers preferential consideration during acquisition decisions by the entity.

30. The apparatus of claim 29, wherein the curriculum is based on subject matter expertise possessed by the entity.

31. The method of claim 29, wherein the network interface communicates with a public communication network.

32. The method of claim 31, wherein the network interface communicates with either of an Internet or World Wide Web communication network.

33. The method of claim 29, wherein the network interface communicates with a private communication network.

34. A method for an entity to establish preferred business partners via a communication network, the method comprising:

electronically providing a vendor certification program comprising a curriculum via the communication network on a fee basis;

electronically receiving a notification that a vendor has successfully completed the vendor certification program; and granting certified vendor status upon the vendor indicated in the notification, wherein the certified vendor status confers preferential consideration to the vendor during acquisition decisions by the entity, wherein the curriculum is based on subject matter expertise possessed by the entity;

undertaking an acquisition decision;

accessing information regarding a plurality of vendors, the plurality of vendors comprising at least one vendor having certified vendor status; and providing preferential consideration to the at least one vendor having certified vendor status when resolving the acquisition decision.

* * * * *